(12) United States Patent
Steinmetz et al.

(10) Patent No.: US 11,850,836 B2
(45) Date of Patent: Dec. 26, 2023

(54) METHOD AND INSTALLATION FOR PRODUCING A MULTI-LAYERED WET FRICTION MATERIAL

(71) Applicant: Schaeffler Technologies AG & Co. KG, Herzogenaurach (DE)

(72) Inventors: Stefan Steinmetz, Grünstadt (DE); Alexander Bonet, Hersbruck (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 210 days.

(21) Appl. No.: 17/295,214

(22) PCT Filed: Nov. 26, 2019

(86) PCT No.: PCT/DE2019/101011
§ 371 (c)(1),
(2) Date: May 19, 2021

(87) PCT Pub. No.: WO2020/108701
PCT Pub. Date: Jun. 4, 2020

(65) Prior Publication Data
US 2022/0010856 A1    Jan. 13, 2022

(30) Foreign Application Priority Data

Nov. 27, 2018    (DE) .......................... 102018129892.7

(51) Int. Cl.
*B32B 37/12*    (2006.01)
*B32B 29/00*    (2006.01)
(Continued)

(52) U.S. Cl.
CPC ............ *B32B 37/12* (2013.01); *B32B 29/005* (2013.01); *B32B 37/1027* (2013.01);
(Continued)

(58) Field of Classification Search
CPC ....... F16D 2200/0082; F16D 2069/045; B32B 2377/00; B32B 2313/04;
(Continued)

(56) References Cited

U.S. PATENT DOCUMENTS 5,585,166 A * 12/1996 Kearsey ................ F16D 65/123
428/319.3
6,001,750 A    12/1999 Lam
10,436,272 B2   10/2019 Dong et al.

FOREIGN PATENT DOCUMENTS

DE    19860166 A1    7/1999
DE    69611140 T2    4/2001
(Continued)

*Primary Examiner* — Vishal I Patel

(57) ABSTRACT

A method for producing a multi-layered wet friction material includes providing a bottom layer, providing a top layer produced independently of the bottom layer from different materials, and bonding the bottom layer to the top layer. The bottom layer and the top layer may be produced from different formulations and supplied as raw papers. A formulation of the top layer may include twenty to sixty percent (20%-60%) filler, ten to forty percent (10%-40%) wood pulp, five to ten percent (5%-10%) aramid, and twenty-five to thirty-five percent (25%-35%) phenolic resin. A formulation of the bottom layer may include ten to fifty percent (10%-50%) filler, ten to forty percent (10%-40%) wood pulp, five to ten percent (5%-10%) aramid, five to fifteen percent (5%-15%) carbon, and twenty-five to thirty-five percent (25%-35%) phenolic resin.

7 Claims, 2 Drawing Sheets

(51) Int. Cl.
*B32B 37/10* (2006.01)
*F16D 69/00* (2006.01)
*F16D 69/04* (2006.01)

(52) U.S. Cl.
CPC .. *B32B 37/1284* (2013.01); *B32B 2037/1238* (2013.01); *B32B 2037/1253* (2013.01); *B32B 2250/02* (2013.01); *B32B 2260/028* (2013.01); *B32B 2260/046* (2013.01); *B32B 2262/067* (2013.01); *B32B 2305/30* (2013.01); *B32B 2307/718* (2013.01); *B32B 2313/04* (2013.01); *B32B 2317/16* (2013.01); *B32B 2361/00* (2013.01); *B32B 2377/00* (2013.01); *B32B 2386/00* (2013.01); *B32B 2475/00* (2013.01); *F16D 2069/002* (2013.01); *F16D 2069/008* (2013.01); *F16D 2069/045* (2013.01); *F16D 2200/0052* (2013.01); *F16D 2200/0078* (2013.01); *F16D 2200/0082* (2013.01)

(58) Field of Classification Search
CPC ........ B32B 2037/1238; B32B 37/1284; B32B 37/1027; B32B 37/12
See application file for complete search history.

(56) References Cited

FOREIGN PATENT DOCUMENTS

| | | |
|---|---|---|
| DE | 69716466 T2 | 2/2003 |
| DE | 60011495 T2 | 11/2004 |
| DE | 60110996 T2 | 10/2005 |
| DE | 60210953 T2 | 9/2006 |
| DE | 60309396 T2 | 2/2007 |
| DE | 60221006 T2 | 10/2007 |
| DE | 102011086521 A1 | 6/2012 |
| DE | 19906980 B4 | 9/2013 |
| EP | 0971151 A1 * | 1/2000 |
| EP | 0807766 B1 | 12/2003 |
| EP | 0854305 B1 | 10/2005 |
| EP | 0971151 B1 | 10/2008 |
| JP | H0835532 A | 2/1996 |
| JP | 2002001749 A | 1/2002 |
| JP | 2000161406 A | 6/2006 |
| JP | 2017524872 A | 8/2017 |
| WO | 2010/142265 A1 | 12/2010 |
| WO | 2015176726 A1 | 11/2015 |

* cited by examiner

METHOD AND INSTALLATION FOR PRODUCING A MULTI-LAYERED WET FRICTION MATERIAL

CROSS-REFERENCE TO RELATED APPLICATIONS

This application is the United States National Phase of PCT Appln. No. PCT/DE2019/101011 filed Nov. 26, 2019, which claims priority to German Application No. DE102018129892.7 filed Nov. 27, 2018, the entire disclosures of which are incorporated by reference herein.

TECHNICAL FIELD

The present disclosure relates to a method and an installation for producing a multi-layered wet friction material having at least one bottom layer and at least one top layer, which are bonded to one another.

BACKGROUND

From the European patent EP 0 807 766 B1, there is known a method for producing asbestos-free friction material, which includes the formation of a first layer with oil-absorbent fibers and/or fillers, and the adhesive bonding of a second layer to the first layer. The second layer is temperature-resistant and includes high-strength fibers and/or friction-modifying materials, and the first layer has a lower density than the second layer.

A method for producing an asbestos-free friction material is known from European patent specification EP 0 854 305 B1, having the following steps: forming a primary layer including non-linear elastic fibers, cotton fibers, and filler material, and adhesively connecting a secondary layer to the primary layer. The secondary layer includes aramid fibers, optionally filler material, and optionally synthetic graphite. The secondary layer also includes cotton fibers and porous carbon particles.

SUMMARY

The present disclosure provides a method for producing a multi-layered wet friction material with at least one bottom layer and at least one top layer, which are bonded to one another. The bottom layer and the top layer are first made independently of one another from different materials, before the bottom layer is connected with the top layer. The bottom layer is also called underlayer. The upper layer is also called overlayer. The material manufacturing process is decoupled from the multi-layering process. This means that friction material for the bottom layer is produced independently of the friction material for the top layer. The manufacturing process for the friction material thus has all degrees of freedom without the multi-layering process restricting same.

The separately produced friction materials for the bottom layer and the top layer are then connected to one another in an additional process, for example in a lamination or laminating process, to form the multi-layered wet friction material. The different materials are connected to one another by means of temperature and pressure in a continuous or in a discontinuous process. The connection is established either by a binder material already present in some materials or by a binder material specifically applied to the interface between two layers. Depending on requirements, the interface between two layers can be designed to be tight, that is, impermeable for fluids, or porous, that is, permeable for fluids.

In an exemplary embodiment of the method, the bottom layer and the top layer are produced from different formulations and supplied as raw papers. The bottom layer and the top layer may each be produced in a paper process having two headboxes, but are not directly connected to one another, rather instead wound onto coils after production, for example, from which the raw papers for the bottom layer and the top layer are then supplied in a subsequent process or process step.

Further exemplary embodiments of the method may include a top layer formulation having twenty to sixty percent filler, ten to forty percent wood pulp, five to ten percent aramid and twenty-five to thirty-five percent phenolic resin; and a bottom layer formulation having ten to fifty percent filler, ten to forty percent wood pulp, five to ten percent aramid, five to fifteen percent carbon, and twenty-five to thirty-five percent phenolic resin. The friction material may be used to create friction lining thicknesses that are less than one millimeter. Friction linings made with the wet friction material are, for example, 0.6 millimeters or 0.75 millimeters thick.

In another exemplary embodiment of the method, the bottom layer may have a basis weight of one hundred to two hundred grams per square meter, with the top layer having a basis weight of two hundred to four hundred grams per square meter. These basis weights have proven to provide desirable results in tests with the claimed method.

In another example embodiment of the method, the bottom layer is coated with a binder material before the bottom layer, which is coated with the binder material, is connected to the top layer. The bonding of the bottom layer to the top layer may be carried out under the action of pressure and the action of temperature or heat.

In another example embodiment of the method, the bottom layer is coated with a resin powder as a binder material. A scatter powder coating with phenolic resin powder may be used to coat the substrate with the binder material.

in another exemplary embodiment of the method, the different materials are connected to one another by means of temperature and pressure. The pressure is applied, for example, by rolling or pressing. The temperature can be supplied by supplying heat, for example via radiant heat.

In another exemplary embodiment of the method, the bottom layer, which may be coated with a or the binder material, is connected to the top layer in a lamination process or laminating process. For this purpose, the two layers together with the binder material can be led through, for example, between two rolls, e.g., two calender rolls that may be heated.

In another exemplary embodiment of the method, the bottom layer, which may be coated with a or the binder material, is connected to the top layer in a double-belt press. In tests carried out with the double-belt press, it was already possible to achieve good results within the scope of the present disclosure. In the double-belt press, the two layers may be heated with suitable heating devices. In addition, the layers connected with one another are then cooled with suitable cooling devices in the double-belt press. The finished wet friction material can then be wound up on a suitable roll, for example, before it is then processed further, for example by punching.

The present disclosure also relates to an installation for producing a multi-layered wet friction material with at least one bottom layer and at least one top layer, which are bonded to one another, according to a method described above. The installation includes a double-belt press in which different raw papers are supplied from coils. The installation also includes a scatter powder coating device. A suitable binder material is supplied via the scatter powder coating device.

The present disclosure further relates to a wet friction material, which was produced, for example, on an installation described above, according to a method described above. The multi-layered wet friction material may be a fiber-based friction material for wet-running applications, such as in double clutch transmissions, automatic transmissions, motorcycle transmissions, single and retaining clutches, differentials, hybrid clutches, converter lock clutches, and synchronizers.

BRIEF DESCRIPTION OF THE DRAWINGS

Further advantages, features and details of the disclosure emerge from the following description, in which various exemplary embodiments are described in detail with reference to the drawings. In the figures.

DETAILED DESCRIPTION

Figure 1:
FIG. 1 shows a top layer in section.
Figure 2:
FIG. 2 shows a bottom layer in section.
Figure 5:
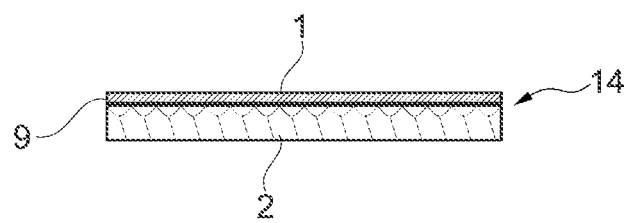
FIG. 5 shows the wet friction material in section.

In FIG. 1, an upper layer 1 for producing a wet friction material, denoted by 14 in FIG. 5, is shown in a simplified section. In FIG. 2, a bottom layer 2 for producing the wet friction material designated by 14 in FIG. 5 is shown in a simplified section. The top layer 1 and the bottom layer 2 are produced independently of one another using a conventional paper making process, which is also referred to in short as the paper process.

Figure 3:
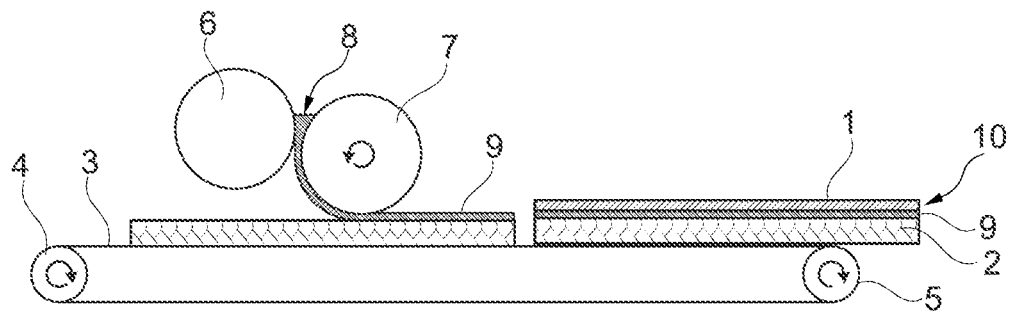
FIG. 3 shows a schematic representation of a method step in the production of a wet friction material.

In FIG. 3, it is shown schematically that during the production of the wet friction material 14, the bottom layer 2 is first supplied to a conveyor belt 3. The conveyor belt 3 is driven with the aid of two transport rollers 4, 5.

A binder material 8 in the form of a binder material layer 9 is applied to the substrate 2 with the aid of two binder rollers 6, 7. The top layer 1 is then applied to the binder material layer 9. This results in a semi-finished product 10 in which the binder material layer 9 has not yet hardened.

The binder material is an adhesive that includes, for example, a resin, e.g., a phenolic resin. The adhesive, e.g., the resin, hardens under the action of heat, so that the bottom layer 2 is firmly bonded to the top layer 1 via the binder material layer 9.

Figure 4:
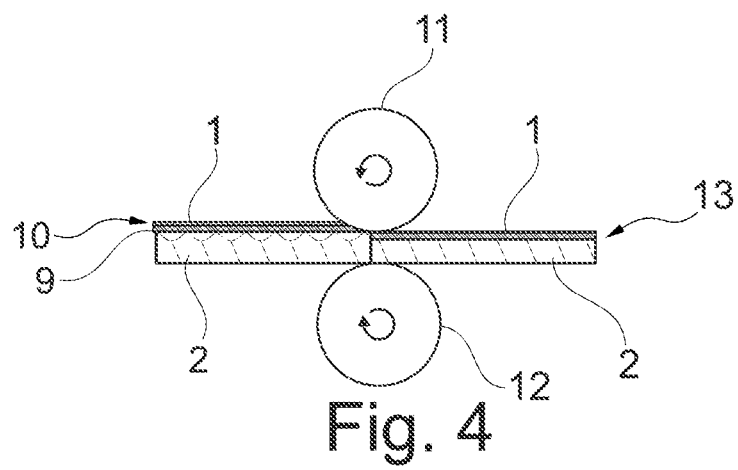
FIG. 4 shows a schematic representation of a further method step in the production of a wet friction material.

FIG. 4 indicates schematically that the semi-finished product 10 from FIG. 3 is passed between two calender rolls 11, 12 to bond the top layer 1 to the bottom layer 2 with the aid of the binder material layer 9. The calender rolls 11, 12 may be heated to supply the binder material layer 9 with the heat required for curing. This results in an intermediate product 13.

In FIG. 5, the wet friction material 14 is shown schematically in section. The top layer 1 is firmly bonded to the bottom layer 2 with the aid of the binder material layer 9. The bottom layer 1 and the top layer 2 are made of different materials.

The materials produced separately from one another are connected to one another in an additional process, for example in the lamination or laminating process indicated in FIG. 4, to form the multi-layered material shown in FIG. 5. This process is characterized by the fact that the different materials are connected to one another by means of pressure and temperature in a continuous or discontinuous process.

Figure 6:
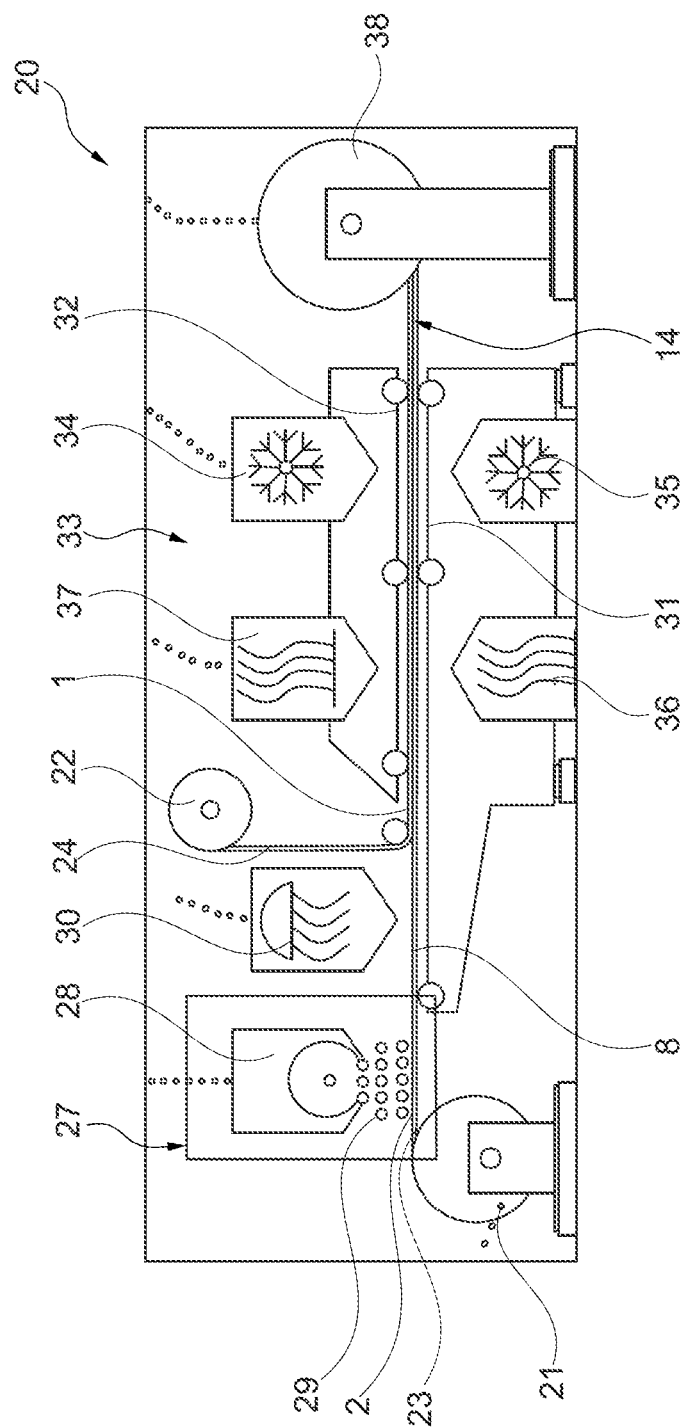
FIG. 6 shows an installation for producing the wet friction material.

An installation 20 for producing the wet friction material 14 is shown schematically in FIG. 6. The installation 20 includes two coils 21, 22, via which different raw papers 23, 24 are supplied.

The term coil denotes a spool, roll, or cylinder on which the different raw papers 23, 24 are wound. The raw paper 23 is used to represent the bottom layer 2 of the wet friction material 14. The raw paper 24 is used to represent the top layer 1 of the wet friction material 14.

The installation 20 includes a scatter powder coating device 27. The scatter powder coating device 27 includes a powder spreader 28, via which a resin powder 29 is applied to the substrate 2. The resin powder 29 is used to represent the binder material layer 8 on the substrate 2.

The installation 20 also includes a double-belt press 33 with two belts 31, 32, which are driven by drive rollers, which are not designated in any further detail. The bottom layer 2 with the binder material 8 is first supplied to the belt 31 arranged at the bottom in FIG. 6. Then the raw paper 24 is supplied to represent the top layer 1. The binder material 8 on the bottom layer 2 can be heated via an optional heating device 30 before the raw paper 24 is supplied.

After the raw paper 24 has been supplied, the two raw papers 23 and 24 together with the binder material 8 are passed between the belts 31, 32 of the double-wall press 33.

The double-belt press 33 is equipped with heating devices 36, 37 and cooling devices 34, 35 at the top and bottom in FIG. 6. The heating device 36 is arranged at the bottom in FIG. 6, i.e., below the bottom layer 2. The cooling device 35 is also arranged below in FIG. 6, i.e., below the bottom layer 2. The cooling device 37 is arranged at the top in FIG. 6, i.e., above the top layer 1. The cooling device 34 is also arranged above the top layer 1 in FIG. 6.

With the heating devices 36, 37 heat is supplied to the raw papers 23, 24 and the binder material 8 arranged therebetween. The heat supplied has the result that resin components, e.g., phenolic resin components, harden in the bottom layer 2, the top layer 1, and in the binder material 8, so that a stable bond results, which is the wet friction material 14. The cured wet friction material 14 is cooled with the cooling devices 34, 35. The cooled wet running friction material 14 is then wound onto a roll 38.

REFERENCE NUMERALS

1 Top layer
2 Bottom layer
3 Transport belt
4 Transport roller
5 Transport roller
6 Binder roller
7 Binder roller
8 Binder material
9 Binder material layer
10 Semi-finished product
11 Calender roll
12 Calender roll 13 Intermediate
14 Wet friction material
20 Installation
21 Coil
22 Coil
23 Raw paper
24 Raw paper
27 Scatter powder coating device
28 Powder spreader
29 Resin powder
30 Optional heating device
31 Belt
32 Belt
33 Double-belt press
34 Cooling device
35 Cooling device
36 Heating device
37 Heating device
38 Roller

The invention claimed is:

1. A method for producing a multi-layered wet friction material, comprising:
   providing a bottom layer supplied as a first raw paper;
   providing a top layer produced independently of the bottom layer from different materials and a different formulation, the top layer supplied as a second raw paper;
   bonding the bottom layer to the top layer by means of temperature and pressure; and
   winding the multi-layered wet friction material on a suitable roll.

2. The method of claim 1, wherein:
   a formulation of the top layer comprises:
   twenty to sixty percent (20%-60%) filler;
   ten to forty percent (10%-40%) wood pulp;
   five to ten percent (5%-10%) aramid; and
   twenty-five to thirty-five percent (25%-35%) phenolic resin; and
   a formulation of the bottom layer comprises:
   ten to fifty percent (10%-50%) filler;
   ten to forty percent (10%-40%) wood pulp;
   five to ten percent (5%-10%) aramid;
   five to fifteen percent (5%-15%) carbon; and
   twenty-five to thirty-five percent (25%-35%) phenolic resin.

3. The method of claim 1, wherein:
   the bottom layer comprises a basis weight of one hundred to two hundred grams per square meter (100-200 g/m^2); and
   the top layer comprises a basis weight of two hundred to four hundred grams per square meter (200-400 g/m^2).

4. The method of claim 1, further comprising coating the bottom layer with a binder material prior to the step of bonding the bottom layer to the top layer.

5. The method of claim 4, wherein the binder material is a resin powder.

6. The method of claim 1, wherein the bonding the bottom layer to the top layer comprises coating the bottom layer with a binder material and connecting the bottom layer to the top layer by a lamination process.

7. The method of claim 1, wherein the bonding the bottom layer to the top layer comprises coating the bottom layer with a binder material and connecting the bottom layer to the top layer in a double-belt press.

* * * * *